Patented Oct. 18, 1938

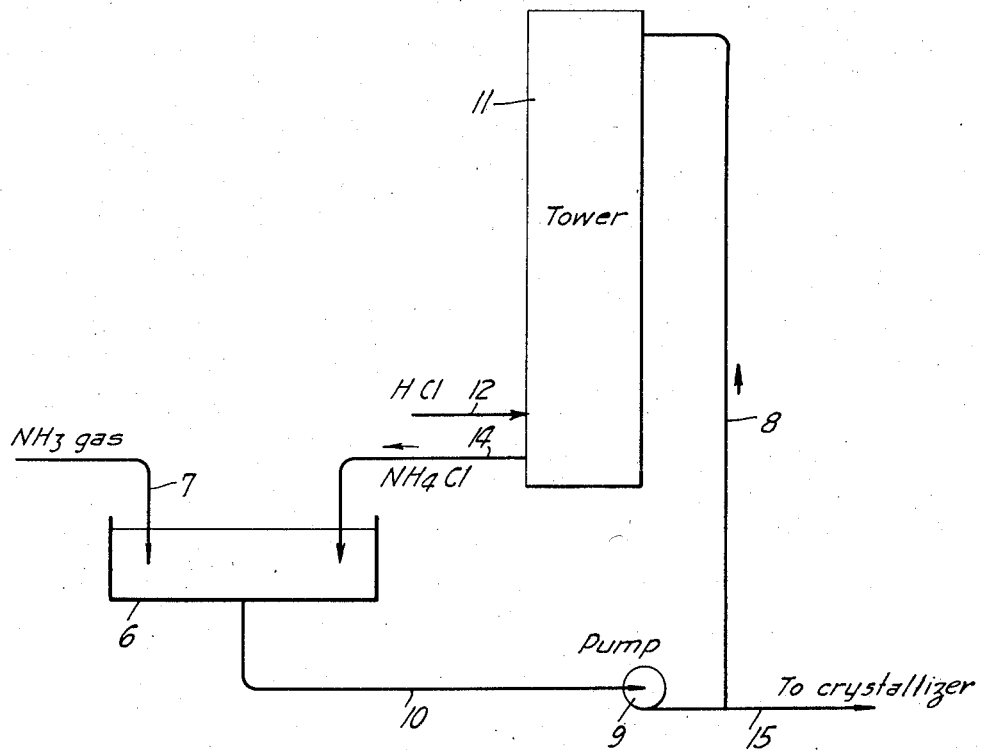

2,133,513

UNITED STATES PATENT OFFICE 2,133,513

PROCESS OF MAKING AMMONIUM CHLORIDE

Wilhelm Hirschkind, Berkeley, Calif., assignor to Great Western Electro-Chemical Company, a corporation of California Application January 10, 1936, Serial No. 58,528

3 Claims. (Cl. 23—100)

This invention relates to the manufacture of ammonium chloride from ammonia and hydrochloric acid.

In Patents 1,919,943 of July 25, 1933, and 1,987,572 of January 8, 1935, it has been proposed to react directly ammonia and chlorine. However, this process gives rise to chloramines. In addition, the process must be conducted at high temperatures and, in the case of the first mentioned, a close pH control must be maintained.

In Patent 1,654,125 of December 27, 1927, Howard has disclosed the manufacture of ammonium chloride from gas liquor and hydrochloric acid. Howard characterizes the direct reaction of gaseous hydrochloric acid and ammonia on a commercial scale as being inconvenient, expensive and involving the utilization of too much equipment, equipment such as reflux condensers. I have found that ammonium chloride can be manufactured directly from hydrochloric gas and ammonia gas in a very simple manner in equipment of a simple nature which does not involve the use of reflux condensers nor which is otherwise complicated.

It is in general the object of the present invention to provide a simple process for the manufacture of ammonium chloride directly from ammonia gas and hydrochloric acid gas.

The invention includes other objects and features of advantage, some of which, together with the foregoing will appear hereinafter wherein the present preferred manner of practicing the process of my invention will be disclosed.

In the drawing, the single figure is a diagrammatic representation of an apparatus for carrying out the process.

The process of my invention contemplates the use of a pool of water as a means for absorbing both the ammonia gas and the hydrochloric acid gas at the same time that the pool provides a carrier for the ammonium chloride formed. The addition of the ammonia gas and the hydrochloric acid gas is continued until the concentration of ammonium chloride has built up to a desired value. While the process can be conducted on a continuous basis, additional water being added to the pool to make up for that continuously withdrawn, I have found it convenient to operate on a batch operation scheme in accordance with which the concentration of ammonium chloride is permitted to build up in the pool until a desired value is reached when the pool is cooled and the ammonium chloride crystallized and recovered.

By utilizing this process, I am free from the objections raised by Howard in his aforementioned patent and I possess the additional advantage over Howard that I can utilize directly the gaseous reactants as well as providing a process which is independent of the capacity of the apparatus employed.

Further details of my process will become apparent upon considering the following example of operation of the apparatus disclosed.

Referring to the drawing I show an open vessel 6 containing a body of water or mother liquor. To this body is added through line 7 ammonia gas. The aqueous pool provided by the body absorbs the ammonia gas and provides dilution thereof. The body is continuously circulated through line 8 by a pump 9 to the top of a reflux tower 11. Near the base of this tower hydrochloric acid gas is added through line 12 while an ammonium chloride solution is withdrawn through line 14 into the vessel 6. In operation, the ammonia gas and hydrochloric acid gas are absorbed in the continuously circulated liquor. In this respect, the aqueous body provided suffices as a medium for absorbing the two gases and providing for their reaction as well as for withdrawal of the ammonium chloride formed. The absorption tower provided for the hydrochloric acid gas can be a simple reflux column provided with a plurality of baffles so that the hydrochloric acid gas is absorbed by the descending stream from line 8.

In practice I have found it desirable to operate with an acid body and the stream of ammonium chloride returning to the vessel 6 therefore preferably carries hydrochloric acid in solution, preferably in a concentration of about 20 grams per liter. This avoids loss of ammonia when it is added through line 7.

The hydrochloric acid gas can be produced in any preferred manner as, for instance, from hydrogen and chlorine or incidental to the niter cake or salt cake operations. I have employed with success that process disclosed in Patent 1,485,816 of March 4, 1924, to Rosenstein which process is further developed in my joint patent with Schedler, Patent 1,695,552 of December 18, 1928. The hydrochloric acid gas used can be varied between various percentages and I have used gas coming from a generator disclosed in the aforementioned patent with as little as 65% hydrochloric acid as well as gas entirely consisting of this acid. The hydrochloric acid gas produced by the process of the aforementioned patent sometimes contains free chlorine, depending upon the method of operation of the furnaces. The process of the present invention is particularly applicable in the handling of a gas containing free chlorine, for it enables the possible formation of explosive nitrogen trichloride to be entirely avoided. Thus the ammonia is absorbed in an acid medium and in a vessel open to the atmosphere, so that if any nitrogen trichloride is formed it is immediately dispelled into the atmosphere. At the same time, the temperature of operation is preferably kept at such a point that the nitrogen trichloride is rapidly decomposed by hydrolysis. The process of the present invention also avoids the formation of difficultly handled ammonium chloride fumes, the hydrochloric acid gas being separately absorbed away from any region whereat it can contact with gaseous ammonia.

In operation it is not usually necessary to heat the aqueous body since the heat of reaction usually suffices to maintain the temperature. I have found an operating temperature between 70–95° C. suitable and I usually operate at 76° C. This corresponds to a concentration of 37–45% ammonium chloride for the range; at 80° the concentration is 39%. The operation is continued until the solution in the vessel 6 is saturated with ammonium chloride after which the solution is removed therefrom to crystallizers through line 15 wherein the ammonium chloride is recovered upon cooling the saturated solution. The mother liquor can be returned for further use until the impurities therein build up to an undesirable upper limit.

The process herein disclosed is in commercial operation. To provide for production of gray ammonium chloride, a material demanded by many ammonium chloride consumers, I have found it desirable to operate with ferric chloride present, a concentration of ferric chloride being maintained in the vessel 6 of about 18 grams per liter and between 10 and 20 grams per liter. This material results in the ammonium chloride, when crystallized, being a gray color. It also seems to have certain desirable effects upon the crystal hardness and the size of crystals and operation of the process in the presence of considerable concentration of ferric chloride is therefore contemplated.

To secure large crystals crystallization is conducted under quiescent conditions, usually on holders dipping in the solution. Small crystals are secured in conjunction with agitation as by circulating the liquor or by air agitation.

I claim:

1. A process for producing ammonium chloride comprising maintaining an aqueous body at a temperature above about 70° C. and in such environment as to permit escape of gases from said body, circulating a stream from said body and passing the same through a tower counter-concurrently to a stream of gaseous HCl, returning said stream now containing about 20 grams per liter of HCl to said body, and adding ammonia to said body to react with any HCl in excess of that required to keep said body appreciably acid, removing a portion of said body, and cooling to crystallize ammonium chloride therefrom.

2. A process for producing ammonium chloride comprising maintaining an aqueous body exposed to the atmosphere and at a temperature above about 70° C., circulating a stream from said body and adding chlorine contaminated HCl thereto separate from said body, returning said stream now containing about 20 grams per liter of HCl to said body, and adding ammonia to said body to react with any HCl in excess of that required to keep said body appreciably acid.

3. A process for producing ammonium chloride comprising maintaining an aqueous body exposed to the atmosphere and at a temperature above about 70° C., circulating a stream from said body and adding chlorine contaminated HCl thereto separate from said body, returning said stream now containing about 20 grams per liter of HCl to said body, and adding ammonia to said body to react with any HCl in excess of that required to keep said body appreciably acid, removing a portion of said body, and cooling to crystallize ammonium chloride therefrom.

WILHELM HIRSCHKIND.